United States Patent

Boyer

[15] 3,639,852

[45] Feb. 1, 1972

[54] CONTROL ARRANGEMENT FOR NARROW BAND SWITCHING FILTER

[72] Inventor: Marcel Louis Boyer, Chatillon, France

[73] Assignee: C. I. F.-Compagnie Industrielle Des Telecommunications, Paris, France

[22] Filed: June 16, 1970

[21] Appl. No.: 46,734

[30] Foreign Application Priority Data

June 16, 1969 France ................................6920019

[52] U.S. Cl. ................................331/1 A, 325/469, 331/4, 331/14, 333/17

[51] Int. Cl. ........................................................H04b 3/04

[58] Field of Search ................331/1, 4, 14; 325/469; 333/17

[56] References Cited

UNITED STATES PATENTS

| | | | |
|---|---|---|---|
| 3,205,451 | 9/1965 | Babany et al. | 331/4 |
| 3,449,690 | 6/1969 | Berman | 331/1 A |

*Primary Examiner*—John Kominski
*Attorney*—Craig, Antonelli & Hill

[57] ABSTRACT

A switching-type matching filter whose switching frequency is extracted from the incident signal, characterized in that it comprises a switching frequency control loop comprising an electronically regulated oscillator, a phase discriminator supplied, on the one hand with a filtered frequency, on the other hand with the frequency of the said oscillator, as well as means for bringing the said oscillator within the coverage range of the phase discriminator and for keeping it within that range if the signal leaving the filter corresponds to predetermined conditions.

6 Claims, 1 Drawing Figure

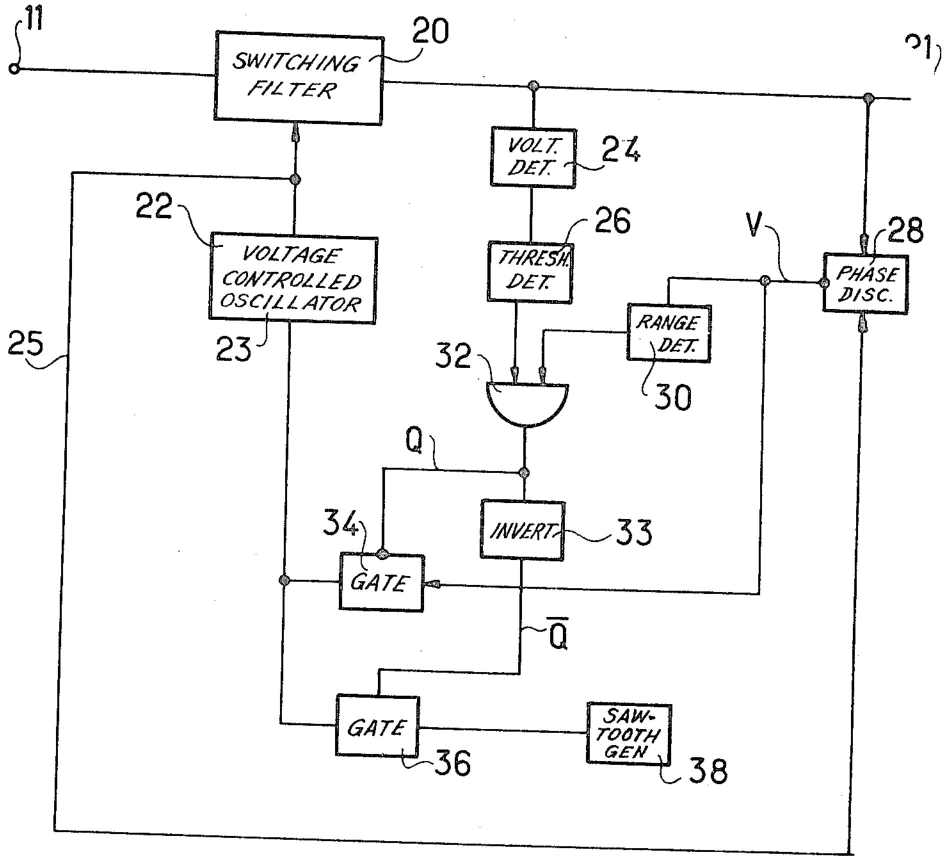
11
SWITCHING FILTER
20
21
VOLT. DET.
24
22
VOLTAGE CONTROLLED OSCILLATOR
23
26
THRESH. DET.
V
28
PHASE DISC.
RANGE DET.
30
25
32
Q
34
INVERT
33
GATE
Q̄
GATE
36
SAW-TOOTH GEN
38

CONTROL ARRANGEMENT FOR NARROW BAND SWITCHING FILTER

The extraction of a pure wave from an interference signal, at the output of a narrow band switching filter in which the switching frequency determining the central frequency of the switching filter is extracted from the input signal itself, after considerable frequency limiting, is already known, the advantage of this arrangement being that possible frequency variations of the input signal can be matched through the filter.

Nevertheless, in the presence of intense interference, the correct determining of the switching frequency is no longer ensured: it is possible that the recurrence frequency altered by interference is deviated too far from the related value for the narrow band filter to allow the required frequency to pass.

That is why the aim of the present invention is to widen the operating range of the matching filter at a low signal-to-noise ratio.

According to the invention a switching-type matching filter comprises a switching frequency control loop containing an electronically adjusted oscillator, a phase discriminator supplied on the one hand with a filtered frequency, on the other hand with the frequency of the said oscillator, as well as means for bringing the said oscillator within the coverage range of the phase discriminator and keeping it there if the output signal of the filter corresponds to predetermined conditions.

The invention will be described in detail taking one embodiment as an example, with reference to the single figure.

In the figure, a signal arriving at 11 is applied to a switching filter 20 which receives its switching frequency from an electronic frequency control oscillator 22, through a variable capacity diode 23, for example.

A phase discriminator 28 is energized, on the one hand by the filtered frequency leaving the filter 20 at 21, and on the other hand by the output frequency of the oscillator 22, transmitted by line 25. The output signal of the filter 20 undergoes, at 24, a detection in connection with a threshold circuit 26. The continuous output signal of the phase discriminator 28 passes through an element 30, which, in itself, is known and, which determines a given level range: the direct voltage V is transmitted by the element 30 only if it is comprised between two predetermined values, $V_1$ and $V_2$. The element 30 can comprise, for example, a first threshold circuit adjusted to $V_1$, in series with an analogue gate, as well as a second threshold circuit adjusted to $V_2$, in parallel with the said first threshold circuit. The output signal of the said second threshold circuit being applied so as to block the analogue gate; this gate transmits only the signals comprised between $V_1$ and $V_2$.

The element 32 is a coincidence gate which transmits an output signal Q in response to coincident receipt of two input signals coming from 26 and from 30 respectively. At the output of a logical inverter 33, the complement $\bar{Q}$ is obtained.

The element 34 is a first analogue gate which transmits the signal V to the oscillator 22 if 2=1; 36 is a second analogue gate which, if $\bar{Q}=1$, transmits to the said oscillator 22 a control signal coming from an element 38. The element 38 can be a scanning voltage generator capable of bringing the frequency of the oscillator 22 within the coverage range of the phase discriminator 28. In a more general way, the element 28 can be an automatic or manual coverage control device.

Operation is as follows:

On starting up, the element 38 supplies, for example, a sawtooth scanning voltage which bring the frequency of the oscillator 22 to a value equal to the rated frequency of the signal reaching input 11. A signal exceeding the threshold set by detector 26 then reaches output 21. The phase discriminator 28 comes into action, and supplies at the output a direct voltage V which is within the prescribed limits. A logical signal Q=1 is obtained at the output of the gate 32 and the voltage V is applied variable capacity diode 23 so as to control the oscillator 22.

If for any reason the control is interrupted, the condition $\bar{Q}=1$ takes the place of the condition Q=1: the scanning voltage supplied by the element 38 once again comes into play.

In the case of violent interferences, the phase discriminator 28 can supply a signal exceeding the maximum value $V_2$ in this case, control could be effected on a different frequency. Control is then interrupted and a new search for a frequency is undertaken.

For an incident frequency capable of varying over a wide range, the element 38 can consist of a manual search control.

I claim:

1. In combination with a switching type matching filter whose switching frequency is controlled by an applied signal, a switching frequency control loop comprising a voltage controlled oscillator providing said applied signal, a phase discriminator having one input connected to the output of said oscillator and a second input connected to the output of said filter, and control means responsive to the detection of the output of said filter within a given frequency range defined by predetermined upper and lower values and above a given threshold for connecting the output of said discriminator in control of said oscillator.

2. The combination defined in claim 1, wherein said control means includes a sawtooth voltage generator, a threshold detector connected to the output of said filter and logic circuit means connected to said threshold detector and said discriminator for connecting the output of said discriminator to said oscillator when the level of the said filter output signal exceeds the value of said given threshold at the same time the level of the discriminator direct output voltage is between said two predetermined values and for connecting the output of said sawtooth voltage generator to said oscillator at all other times.

3. The combination defined in claim 2, wherein said logic circuit means includes a range detector connected to the output of said discriminator for detecting when the level of the discriminator direct output voltage is between said two predetermined levels.

4. The combination defined in claim 3, wherein said logic circuit means further includes a coincidence gate having inputs connected to said range detector and said threshold detector, and a first analog gate responsive to a coincidence output of said coincidence gate for selectively connecting said discriminator to said oscillator.

5. The combination defined in claim 4, wherein said logic circuit means further includes a second analog gate, and an inverter connecting said second analog gate to said coincidence circuit, said second analog gate being responsive to a noncoincidence output of said coincidence gate for connecting said sawtooth voltage generator to said oscillator.

6. The combination defined in claim 1, further including manual means for controlling the frequency of said oscillator.

* * * * *